United States Patent [19]

Inoue

[11] Patent Number: 5,335,330
[45] Date of Patent: Aug. 2, 1994

[54] INFORMATION PROCESSING APPARATUS WITH OPTIMIZATION PROGRAMMING

[75] Inventor: Masao Inoue, Katano, Japan

[73] Assignee: Matsushita Electric Industrial Co., Ltd., Osaka, Japan

[21] Appl. No.: 699,404

[22] Filed: May 13, 1991

[30] Foreign Application Priority Data

May 14, 1990 [JP] Japan .................................. 2-123430
Nov. 30, 1990 [JP] Japan .................................. 2-338121

[51] Int. Cl.$^5$ ............................................... G06F 9/40
[52] U.S. Cl. ..................................... 395/375; 364/262; 364/946.8
[58] Field of Search .................. 364/DIG. 1, DIG. 2; 395/800, 375

[56] References Cited

U.S. PATENT DOCUMENTS

| | | | |
|---|---|---|---|
| 3,700,873 | 10/1972 | Yhap | 364/700 |
| 4,112,489 | 9/1978 | Wood | 395/800 |
| 4,835,679 | 5/1989 | Kida | 395/375 |
| 5,163,139 | 11/1992 | Haigh | 395/375 |

Primary Examiner—David Y. Eng
Attorney, Agent, or Firm—Panitch Schwarze Jacobs & Nadel

[57] ABSTRACT

An information processing apparatus wherein a plurality of instructions are checked in an instruction buffer circuit, the plurality of instructions excluding instructions being executed. If there are instructions which can be executed simultaneously, then the instructions are converted to one instruction and executed. By adjusting the value of a program counter so that new instructions at subsequent addresses can be supplied to the buffers left empty by the above conversion, instructions which require multiple cycles to execute can be processed in one cycle. Using one selector control signal, the necessary number of instructions can be supplied from the instruction cache and executed continuously without leaving the instruction buffer empty after multiple instructions are converted to one instruction and executed. Load instructions which do not need to be executed repeatedly in a program containing loops can be canceled.

4 Claims, 10 Drawing Sheets

| ADDRESS | INS. | | |
|---|---|---|---|
| 00000000 | ld | [r0+0x0], r10 | |
| 00000004 | ld | [r0+0x4], r11 | |
| 00000008 | ld | [r0+0x100], r20 | |
| 0000000c | ld | [r0+0x104], r21 | |
| 00000010 | muld | r20, r10, r30 | |
| 00000014 | ld | [r2+0x58], r6 | |
| 00000018 | ld | [r2+0x5c], r7 | |
| 0000001c | addd | r6, r30, r8 | |
| 00000020 | st | r8, [r3+0x28] | |
| 00000024 | st | r8, [r3+0x2c] | |

Fig. 3b

| ADDRESS | INS. | | |
|---|---|---|---|
| 00000000 | ldd | [r0+0x0], r10 | |
| 00000008 | ldd | [r0+0x100], r30 | |
| 00000010 | muld | r20, r10, r30 | |
| 00000014 | ldd | [r2+0x58], r6 | |
| 0000001c | addd | r6, r30, r8 | |
| 00000020 | std | r8, [r3+0x28] | |

Fig. 9a
REGISTER BAD

| BACKWARD BRANCH INS. ADDRESS | TARGET INS. ADDRESS |
|---|---|

Fig. 9b
TABLE LAD

| LOAD INS. ADDRESS | LOAD ADDRESS MANIPULATION INS. ADDRESS | |
|---|---|---|
| LOAD INS. ADDRESS | LOAD ADDRESS MANIPULATION INS. ADDRESS | ←CANCEL FLAG |
| LOAD INS. ADDRESS | LOAD ADDRESS MANIPULATION INS. ADDRESS | ←CANCEL FLAG |

(←CANCEL FLAG for first row)

Fig. 10

```
ADDRESS      INS.
00000000     ldd     [r0], f0
00000004     ldd     [r30], f30
00000008     ldd     [rl], f2
0000000c     fmuld   f30, f0, f10
00000010     add     r0, 8, r0
00000014     faddd   f10, f2, f20
00000018     addcc   r2, -2, r2
0000001c     add     r1, 8, rl
00000020     std     [r20], f20
00000024     bge     0xffffffdc
00000028     add     r20, 8, r20
```

Fig. 11

INFORMATION PROCESSING APPARATUS WITH OPTIMIZATION PROGRAMMING

BACKGROUND OF THE INVENTION

1. Field of the Invention

This invention relates to an information processing apparatus, and more particularly to an information processing apparatus in which instructions are executed by the pipeline method and is provided with cache memories for instructions and data.

2. Description of the Prior Art

Figure 5:
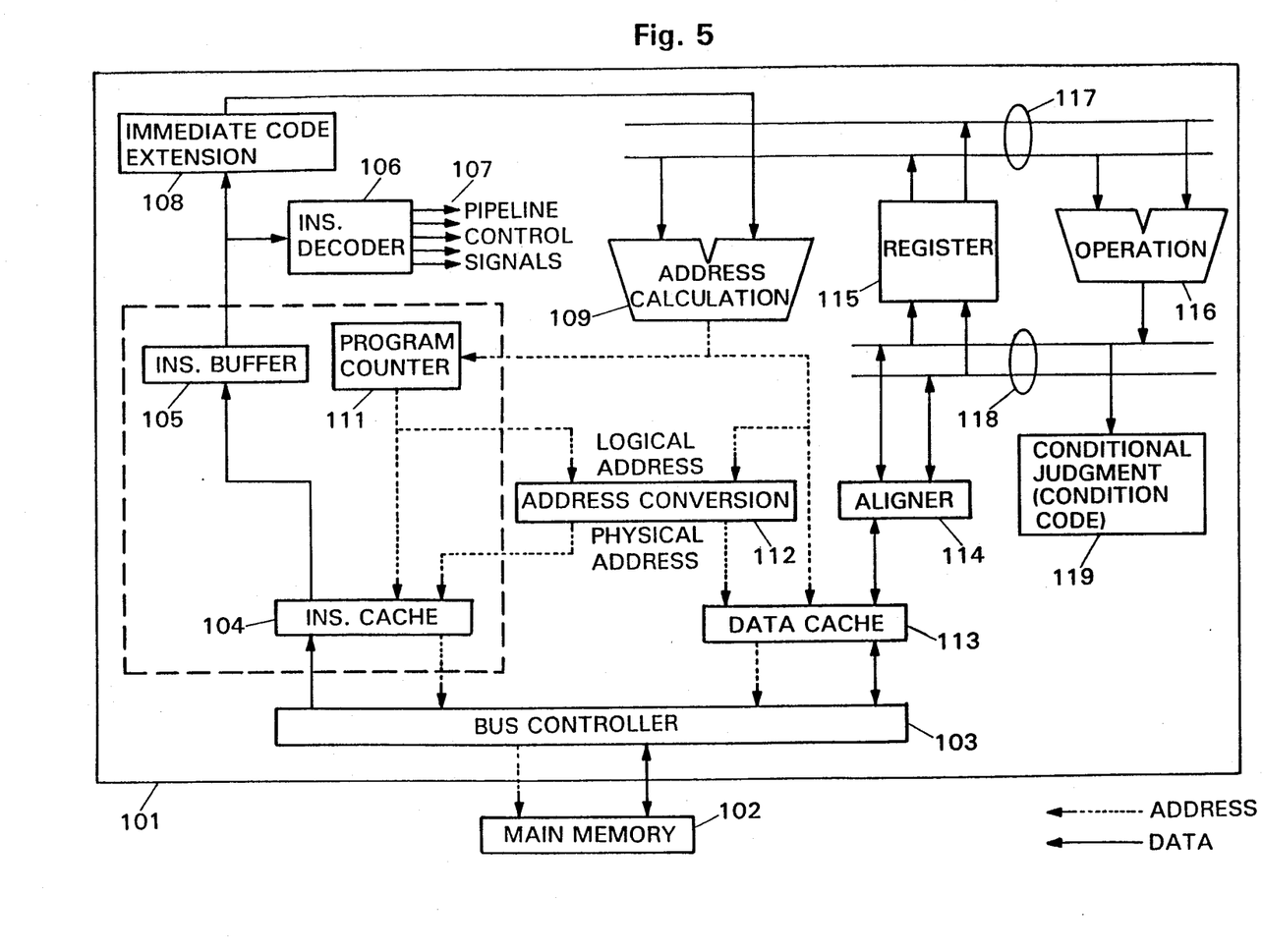
FIG. 5 is a block diagram illustrating an information processing apparatus in the prior art.

FIG. 5 illustrates a conventional pipeline type information processing apparatus which is provided with physical cache memories for instructions and data. In the pipeline type information processing apparatus, the execution of instructions is performed in parallel in four stages: FETCH, DECODE, EXECUTION and STORE stages.

In the FETCH stage, a logical address is translated into a physical address by an address translating unit 112, and an instruction cache 104 is accessed so that an instruction at an address (nPC) indicated by a program counter 111 is fetched into an instruction buffer 105.

Figure 4:
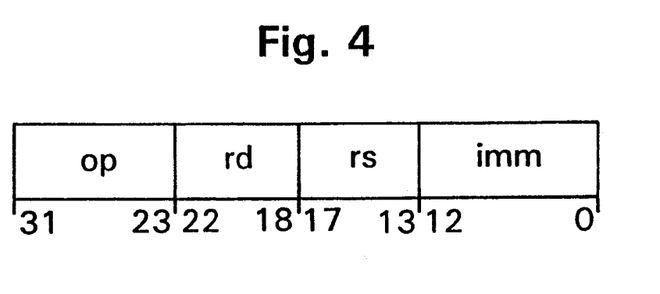
FIG. 4 illustrates an example of instruction formats.

In the DECODE stage, instructions in the instruction buffer 105 are converted by an instruction decoder 106 to pipeline control signals 107 which are in turn used to control an arithmetic and logic unit 116 and data cache 113. In the case of operation instructions, the operands required in the execution of the operation instructions are read from a general purpose registers 115, and then output to an internal bus 117. In the case of load and store instructions, the immediate information contained in the instruction code is converted to single-word data in an immediate code extension unit 108, and the address of the data to be loaded or stored is calculated by an address calculating unit 109. An example of an instruction format used in a 32-bit information processing apparatus is shown in FIG. 4. In this format, the 13-bit "imm" field indicates immediate information, and the "op" field indicates the type of instruction. Instructions which perform generally similar types of functions often employ an instruction set architecture in which they are distinguished by two or three bits. In FIG. 4, "rs" and "rd" indicate the source register and the destination register, respectively. The address of the data to be loaded is calculated in the address calculating unit 109 as [rs +imm].

In the EXECUTION stage, when an operation instruction is issued, each operation is performed in the arithmetic and logic unit 116, and the operation results are output to an internal bus 118. If the operation instruction is accompanied by a conditional Judgment such as overflow, underflow, negative, zero, etc., the above operation results are checked in a conditional Judgment section 119 in which condition codes indicating conditions such as overflow, underflow, negative and zero are generated. When a load instruction is issued, the data cache 113 is accessed, and the data is transferred to the correct bus by an aligner 114 and output to the internal bus 118.

In the STORE stage, the data on the internal bus 118 is stored in the general purpose register 115. In the case of a load instruction, the data is stored in the destination register "rd" indicated in the instruction code.

Figure 6:
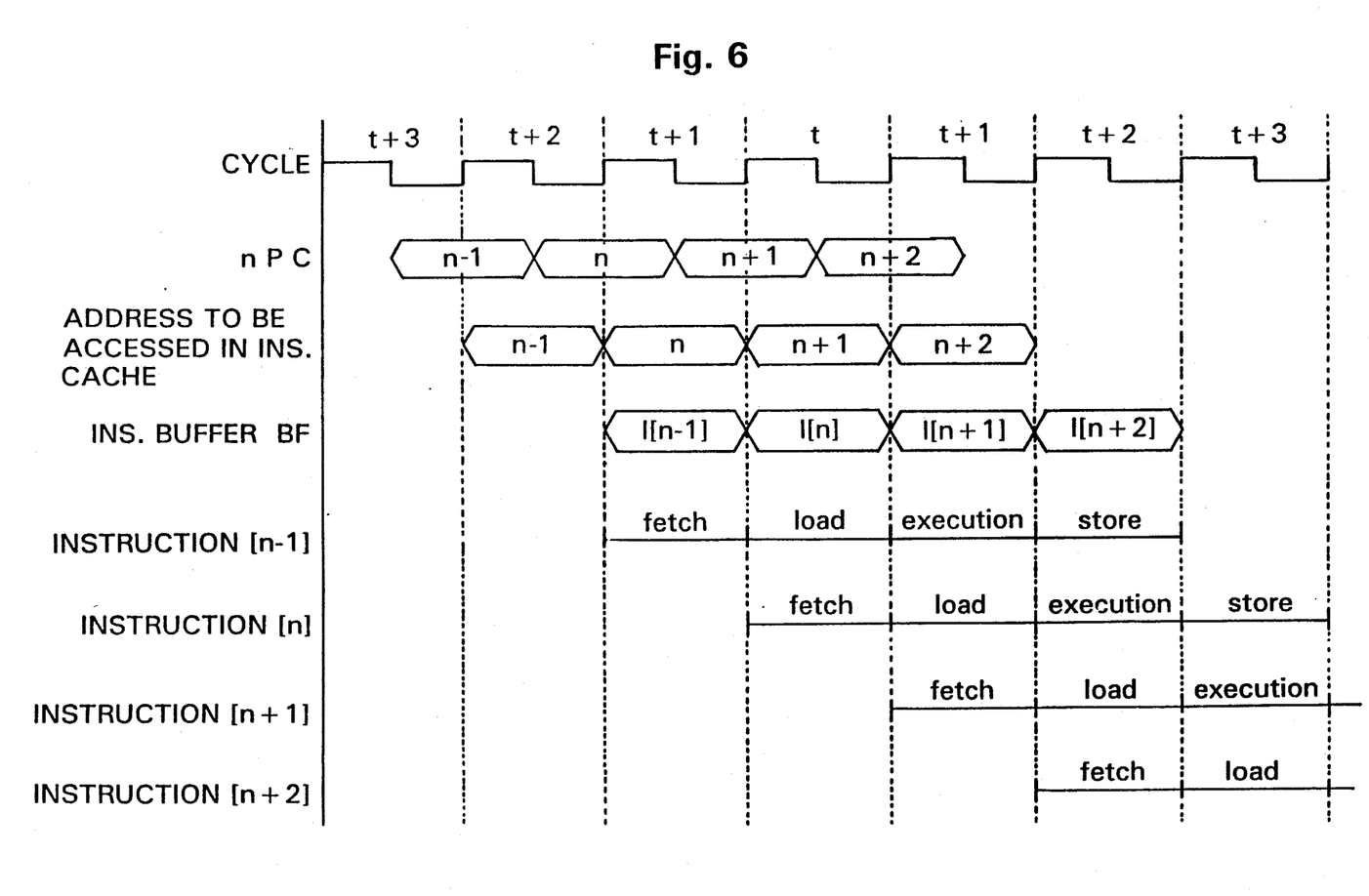
FIG. 6 is a timing chart illustrating pipeline processing in the prior art apparatus.

When the capacities of the caches 104 and 113 are sufficiently large and the miss-hit rate is low, there is almost no need to exchange instructions and data with the main memory 102 via the bus controller 103, and each instruction is processed at every cycle by pipeline processing. FIG. 6 shows a timing chart of pipeline processing in which it is assumed that there is no miss-hit in the cache. In FIG. 6, the instruction address "n" indicated by nPC is output from the program counter 111 during the period from cycle t-2 to cycle t-1. In cycle t-1, a logical address of a portion of the instruction is translated into a physical address, and the instruction cache 104 is accessed. In cycle t, the instruction I[n] at the instruction address "n" is fetched to the instruction buffer 105. In this way, pipeline processing of the instruction I[n] is initiated from the FETCH stage.

Figure 3A:
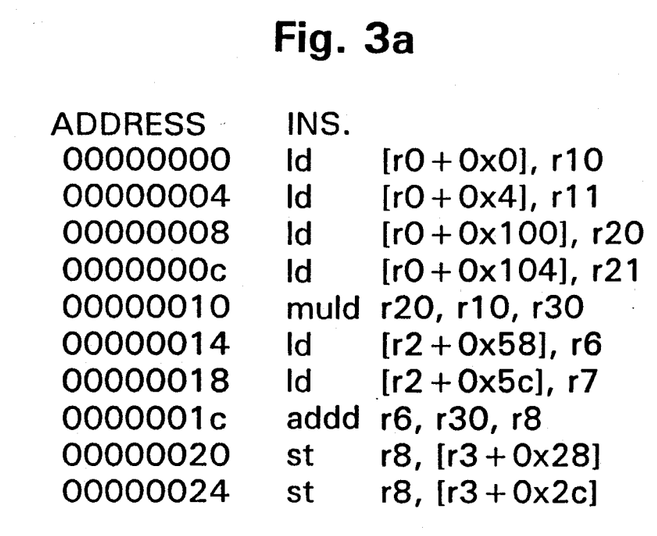
FIG. 3A shows a source program.

FIG. 3A shows an example of a source program supplied from a compiler to the information processing apparatus 101. In FIG. 3A, "ld" is the load instruction, "st" is the store instruction, "muld" is the double-word multiplication instruction, and "addd" is the double-word addition instruction. The "muld" instruction at address 00000010 shown in FIG. 3A performs double-word multiplication between the registers (r20, r21) and the registers (r10, r11), and outputs the results to the registers (r30, r31 ). As shown in this example, the operand data for the operation instruction are often loaded in registers at two consecutive addresses, before the double-word operation instruction.

Figure 10:
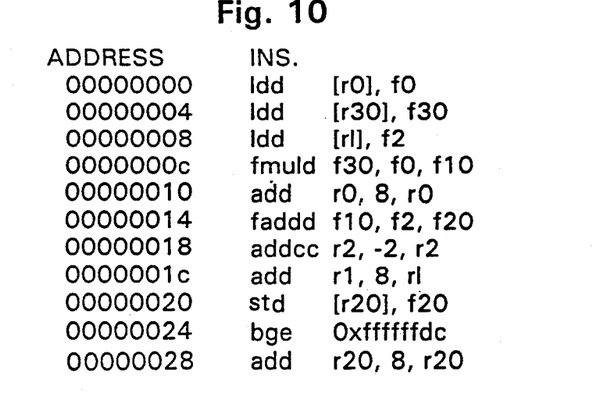
FIG. 10 shows another source program.

FIG. 10 shows another example of a source program supplied from the compiler to the information processing apparatus 101. In FIG. 10, "ldd" is a double-word load instruction, "std" is a double-word store instruction, "fmuld" is a double-word multiplication instruction, "faddd" is a double-word addition instruction, "add" is a single-word addition instruction, "addcc" is a single-word addition instruction for generating the negative condition code in the conditional Judgment section 119 when the result is negative, and "bge" is a backward branch instruction for returning to address 00000000 when the condition code is positive. The instruction at address 00000028 is executed following the branch instruction at address 00000024 before the instruction at address 00000000 is executed.

The program shown in FIG. 10 is repeated until the operation result at address 00000018 becomes negative, and it forms a loop consisting of the 11 steps from address 00000000 to address 00000028. In this program, the addresses loaded by the load instructions at addresses 00000000 and 00000008 change each time the loop is repeated in the add instructions at addresses 00000010 and 0000001c, respectively, but the address loaded by the load instruction at address 00000004 does not change in the loop.

The above-mentioned configuration only has the function to execute the instruction code output from the compiler as it is. Even when an inefficient source program (such as that shown in FIG. 3A) in which processing that can be executed by one set of the double-word load instruction "ldd" is performed twice with the single-word load instruction "ld", the inefficient source program must be executed as is. This increases the number of program steps which must be executed in an information processing apparatus, with the result of an increased processing time. This problem often occurs when executing an application program processed by a compiler with poor optimization performance.

According to the above-mentioned configuration, moreover, in the loop program shown in FIG. 10, load instructions which need to be executed once in the loop such as that shown at address 00000004 are executed each time the loop is repeated. Therefore, the number of program steps which must be executed in an information processing apparatus is increased, thus increasing processing time.

SUMMARY OF THE INVENTION

The information processing apparatus of this invention, which overcomes the above-discussed and numerous other disadvantages and deficiencies of the prior art, comprises means for converting two or more instructions into one or more instructions, said two or more instructions being able to be simultaneously executed, the number of said one or more instructions being less than the number of said two or more instructions.

In preferred embodiments, the information processing apparatus comprises: a plurality of stages of instruction buffers each for storing one or more instructions; determination means for determining whether or not at least two of said instructions stored in said instruction buffers and excluding instructions which are currently executed can be executed simultaneously; conversion means for, when said at least two instructions can be simultaneously executed, converting said at least two instructions into one or more instructions, said converted one or more instructions being stored in one of said instruction buffers, the number of said converted one or more instructions being less than the number of said at least two instructions; adjust means for adjusting the contents of a program counter which indicate the address of an instruction which is to be stored in another one of said instruction buffers, said other one of said instruction buffers being able to store said instruction as a result of said conversion.

Preferably, the number of said stages is three.

Preferably, when said at least two instructions are single-word load instructions, said conversion means converts said single-word load instructions into one multiple-word load instruction.

Preferably, when said at least two instructions are single-word store instructions, said conversion means converts said single-word store instructions into one multiple-word store instruction.

In another aspect of the invention, the information processing apparatus comprises: first and second instruction buffers each for storing an instruction; an instruction string check circuit for checking whether or not said two instructions stored in said first and second instruction buffers can be executed simultaneously, and for, when said two instructions can be executed simultaneously, converting said two instructions into one instruction, and for outputting said one converted instruction, a signal indicative of said conversion and a control signal; a third instruction buffer for receiving said instruction from said second instruction buffer, and said one converted instruction from said instruction string check circuit; first selection means for selectively supplying one of multiple instructions supplied externally, to said first instruction buffer; second selection means for selectively supplying one of one or more instructions supplied externally, and said instruction from said first instruction buffer, to said second instruction buffer; and third selection means for selectively supplying one of said converted instruction from said instruction string check circuit, and said instruction from said second instruction buffer, to said third instruction buffer, said first, second and third selection means controlled by said control signal.

In a further aspect of the invention, the information processing apparatus comprises: a plurality of instruction buffers each for storing an instruction; detection means for checking said instructions stored in said instruction buffers to detect a program loop and an instruction in said program loop, said detected instruction signal being unnecessary to be executed in the second and subsequent implementation of said program loop; cancel means for canceling the execution of said detected instruction in the third and subsequent implementation of said program loop; and adjust means for adjusting the contents of a program counter which indicate the address of an instruction which is to be stored in one of said instruction buffers, said one of said instruction buffers being able to store said instruction as a result of said cancellation.

Preferably, said detected instruction is a load instruction which has no corresponding load address manipulating instruction in said program loop, said load address manipulating instruction manipulating the address to be loaded.

Preferably, said program loop is caused by a backward branch instruction.

Preferably, said detection means detect said program loop on the condition that the address of said backward branch instruction and the address of the target instruction of said backward branch instruction are successively detected twice.

In a still further aspect of the invention, the information processing apparatus comprising: first and second instruction buffers each for storing an instruction; an instruction string check circuit for checking whether or not said instructions stored in said first instruction buffer can be canceled, and for, when said instruction can be canceled, canceling the execution of said instruction, and for outputting an instruction cancel signal indicative of said cancellation and the address of an instruction to be executed subsequently, and a control signal; first selection means for selectively supplying one of multiple instructions supplied externally, to said first instruction buffer; and second selection means for selectively supplying one of one or more instructions supplied externally, and said instruction from said first instruction buffer, to said second instruction buffer, said first and second selection means controlled by said control signal.

By means of the above configuration of the invention, multiple instructions are checked except for instructions being executed in the instruction buffer unit, and if there are instructions which can be executed simultaneously, then the multiple instructions are converted to one instruction and executed. By adjusting the value of the program counter so that new instructions at subsequent addresses can be supplied to the buffers left empty by the above conversion, instructions that required multiple cycles to execute can be processed in one cycle, thus making it possible to speed up the processing of the application program.

Further, using one selector control signal, the necessary number of instructions can be supplied from an instruction cache and executed continuously without leaving the instruction buffer empty after multiple instructions are converted to one instruction and executed.

Also, the processing of programs is speeded up by canceling the execution of load instructions that do not need to be executed repeatedly in the execution of programs containing loops.

Using one selector control signal, the necessary number of instructions can be supplied from the instruction cache and executed continuously without leaving the instruction buffer empty after canceling the execution of instructions.

Thus, the invention described herein makes possible the objectives of:

(1) providing an information processing apparatus which can execute programs at high speed;
(2) providing an information processing apparatus which can reduce the number of steps of a source program;
(3) providing an information processing apparatus in which instructions for two single words are executed with an instruction for one double word; and
(4) providing an information processing apparatus in which the execution of the load instruction which needs to be executed once in loops can be canceled in each time the loop is repeated.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
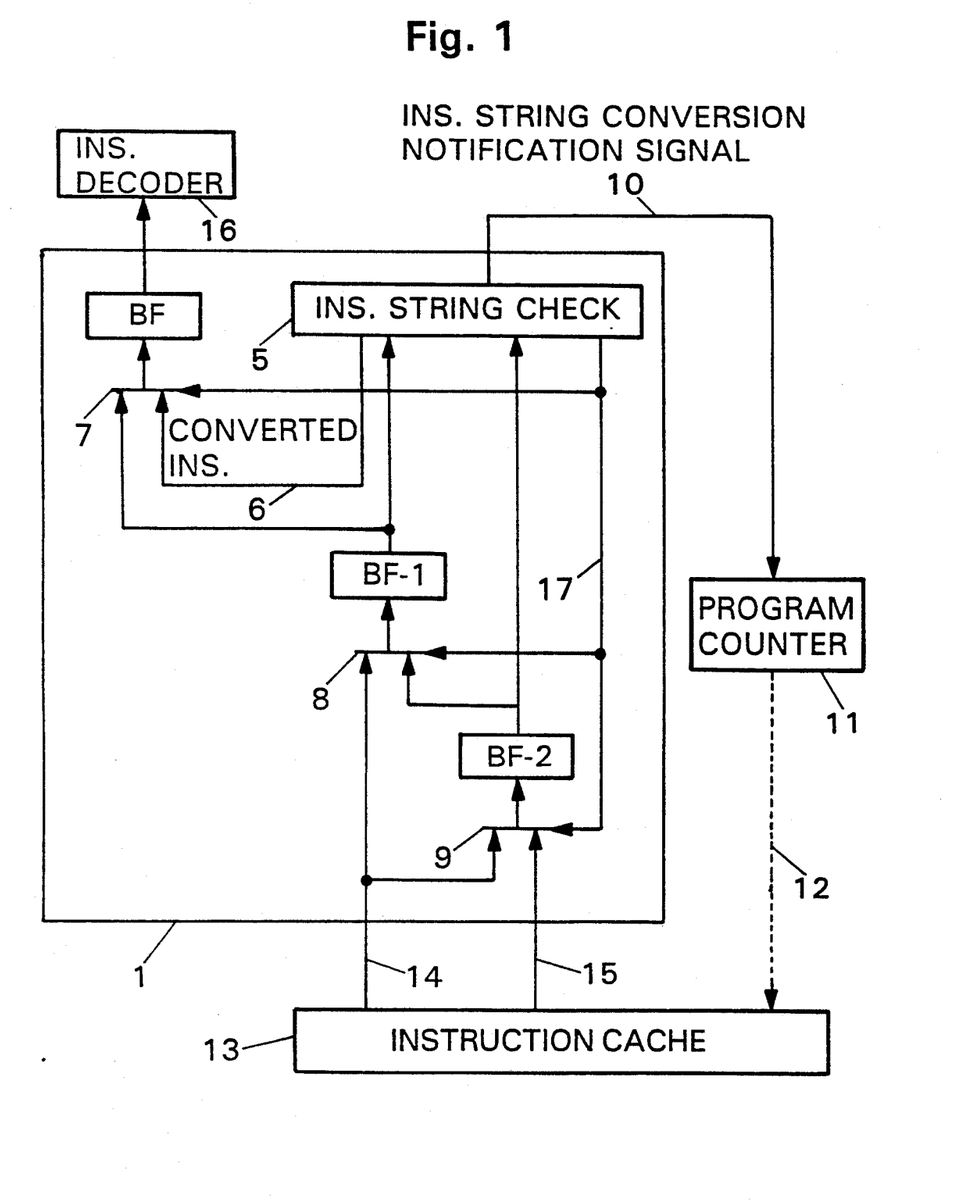
FIG. 1 is a block diagram illustrating an embodiment of the invention.

FIG. 1 illustrates an instruction buffer unit 1 used in an embodiment of the invention. In this embodiment, the portion of the apparatus of FIG. 5 which is enclosed by the broken thick line is improved. The instruction buffer unit 1 comprises three instruction buffers BF, BF-1 and BF-2, and an instruction string check circuit 5 which checks the instruction code in the instruction buffers BF-1 and BF-2. In FIG. 1, 6 indicates a converted instruction for simultaneously executing instructions in the instruction buffers BF-1 and BF-2 which have been converted in the instruction string check circuit 5. The instruction buffer unit 1 further comprises three selectors 7, 8 and 9 which receive a selector control signal 17 from the instruction string check circuit 5. The selectors 7, 8 and 9 are controlled by this selector control signal 17. The numeral 10 indicates an instruction string conversion notification signal, 11 is a program counter, 12 indicates an instruction address nPC+2 which is used to access an instruction cache 13, and 16 is an instruction decoder. The instruction cache 13 accesses two addresses nPC+2 and nPC+3, and supplies two instructions I[nPC+2] and I[nPC+3] to the instruction buffer unit 1 via buses 14 end 15.

The operation of this embodiment will be described. While the instruction in the instruction buffer BF is executed in the FETCH stage, two instructions in the instruction buffers BF-1 and BF-2 which are not currently executed in the instruction buffer unit 1 are input into the instruction string check circuit 5 to determine whether or not they can be simultaneously executed in the instruction buffer unit 1. For example, in a case in which two single-word load or store instructions can be processed with one double-word load or store instruction, the addresses of the source registers "rs" are the same, the addresses of the destination registers "rd" differ only by one, and the values of the immediate "imm" differ only by the difference in the addresses of the data to be accessed. In the case of a store instruction, the conditions for the source registers "rs" and destination registers "rd" are opposite to those for the load instruction. The instruction string check circuit 5 checks whether or not the values of the "op" fields, register address and "imm" field satisfy the predetermined conditions.

When it is determined that the two instructions cannot be executed simultaneously, the selectors 7, 8 and 9 are controlled by the same selector control signal 17 from the instruction string check circuit 5 so that in the next cycle the instruction in the instruction buffer BF-1 is supplied to the instruction buffer BF, the instruction in the instruction buffer BF-2 is supplied to the instruction buffer BF-1, and the instruction I[nPC+2] at the address nPC+2 indicated by the program counter 11 is supplied from the instruction cache 13 to the instruction buffer BF-2 via the bus 14.

When the two instructions are both a single-word load instruction or a single-word store instruction, it is checked as to whether or not the two single-word load or store instructions can be converted to one double-word load or store instruction and processed simultaneously. If YES, then the instruction string check circuit 5 and the instruction buffer BF are coupled with each other via the selector 7, and the converted double-word load or store instruction is supplied in the next cycle as the converted instruction 6 to the instruction buffer BF by the instruction string check circuit 5. The two instruction buffers BF-1 and BF-2 become empty at the same time. The program counter 11 is notified by the instruction string conversion notification signal 10 that the instruction string has been converted, and the value at the instruction address nPC+2 indicated by the program counter 11 is adjusted so that new instructions are supplied to the two instruction buffers BF-1 and BF-2 which have been made empty by the conversion. At this time, the selector control signal 17 is output from the instruction string check circuit 5 so that the selector 8 connects the instruction cache 13 and the instruction buffer BF-1 via the bus 14 and the selector 9 connects 10 the instruction cache 13 and the instruction buffer BF-2 via the bus 15, and the selectors 7, 8 and 9 are all controlled at the same time. By this means, subsequent instructions are continuously and efficiently input into the instruction buffers BF, BF-1 and BF-2 when two instructions are converted to one instruction.

Figure 11:
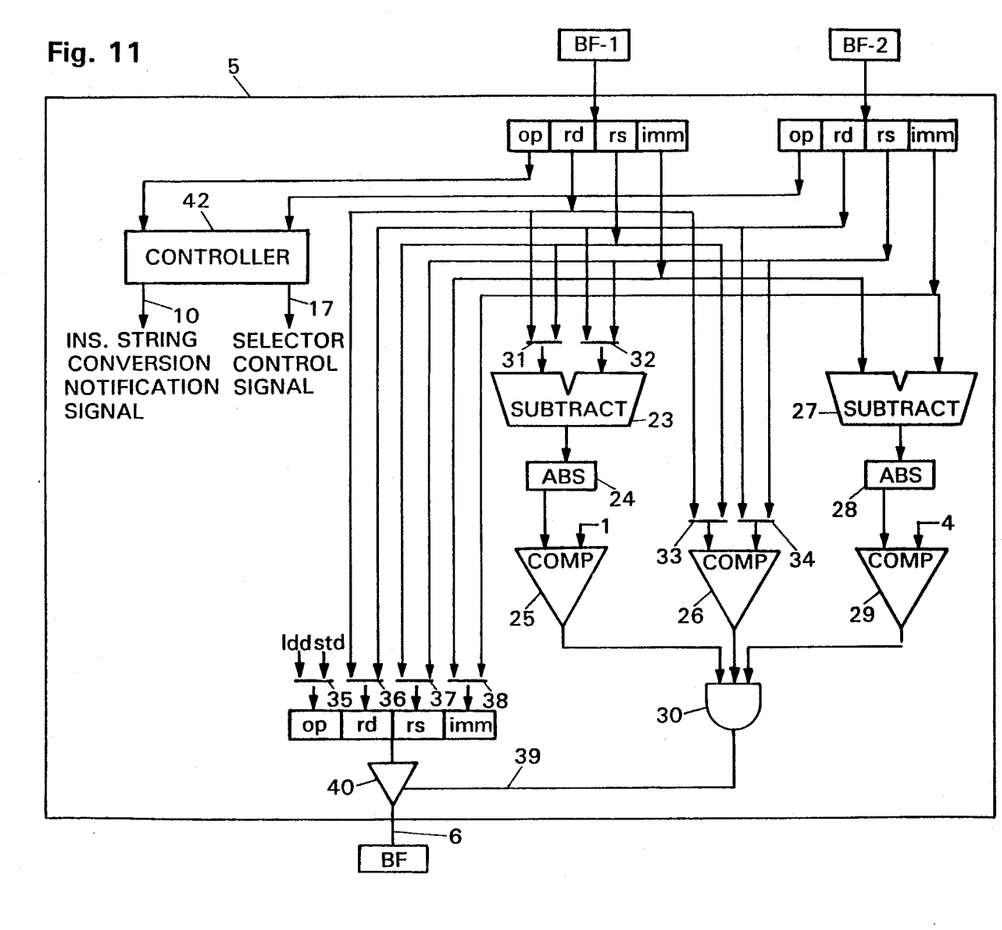
FIG. 11 is a block diagram illustrating an instruction string check circuit used in the embodiment of FIG. 1.

FIG. 11 illustrates the instruction string check circuit 5. Instructions in the instruction buffers BF-1 and BF-2 are fetched into the instruction string check circuit 5 to be checked. A controller 42 checks the "op" field of the two instructions, controls selectors 31 to 38, and outputs the instruction string conversion notification signal 10 and the selector control signal 17. The selectors 31 to 34 are coupled to operation circuits as described below. The selectors 35 to 38 is used to generate the conversion instruction 6. As described above, the selector control signal 17 is output when the instructions can be simultaneously executed.

When the operation fields "op" of both the two instructions checked in the controller 42 include single-word load instructions, the selectors 31 to 34 are controlled so that the source fields "rs" of the two instructions are input into a comparator 26, and that the destination fields "rd" of the two instructions are input into a subtracter 23. The fields of the immediates "imm" of the two instructions are input to a subtracter 27. The output of the subtracter 23 is supplied to an AND gate 30 through an absolute value calculator 24 and a comparator 25, and that of the subtracter 27 is supplied to the AND gate 30 through an absolute value calculator 28 and a comparator 29. The output of the comparator 26 is directly input to the AND gate 30. When the following conditions are satisfied: the destination fields "rd" of the two instructions differ from each other by one; the source fields "rs" of the two instructions are identical with each other; and the immediates "imm" of the two instructions differ from each other by the difference in the addresses to be accessed (in this embodiment, four bytes), the AND gate 30 outputs an enable signal 39 for enabling a switch 40. The selector 35 selects the operation field "op" of the double-word load instruction "ldd", the selector 36 selects the smaller one among the destination fields "rd" of the two instructions, the selector 37 selects either of the source fields "rs" of the two instructions (in this embodiment, the source field "rs" in the instruction buffer BF-1 is selected), and the selector 38 selects the smaller one among the immediates "imm" of the two instructions. The combination of these selected fields "op", "rd", "rs" and "imm" is supplied via the switch 40 to the instruction buffer BF. The controller 42 outputs the instruction string conversion notification signal 10 and the selector control signal 17.

When the operation fields "op" of both the two instructions checked in the controller 42 include single-word store instructions, the selectors 31 to 34 are controlled so that the destination fields "rd" of the two instructions are input into the comparator 26, and that the source fields "rs" of the two instructions are input into the subtracter 23. The fields of the immediates "imm" are input into the subtracter 27. When the following conditions are satisfied: the source fields "rs" of the two instructions differ from each other by one; the destination fields "rd" of the two instructions are identical with each other; and the immediates "imm" of the two instructions differ from each other by the difference in the addresses to be accessed (in this embodiment, four bytes), the AND gate 30 outputs the enable signal 39 for enabling the switch 40. The selector 35 selects the operation field "op" of the double-word store instruction "std", the selector 36 selects the smaller one among the source fields "rs" of the two instructions, the selector 37 selects either of the destination fields "rd" of the two instructions (in this embodiment, the destination field "rd" in the instruction buffer BF-1 is selected), and the selector 38 selects the smaller one among the immediates "imm" of the two instructions. The combination of these selected fields "op", "rs", "rd" and "imm" is supplied via the switch 40 to the instruction buffer BF. The controller 42 outputs the instruction string conversion notification signal 10 and the selector control signal 17.

When the two instructions checked in the controller 42 cannot be converted into instructions which can be executed simultaneously, the controller 42 outputs only the selector control signal 17.

Figure 2:
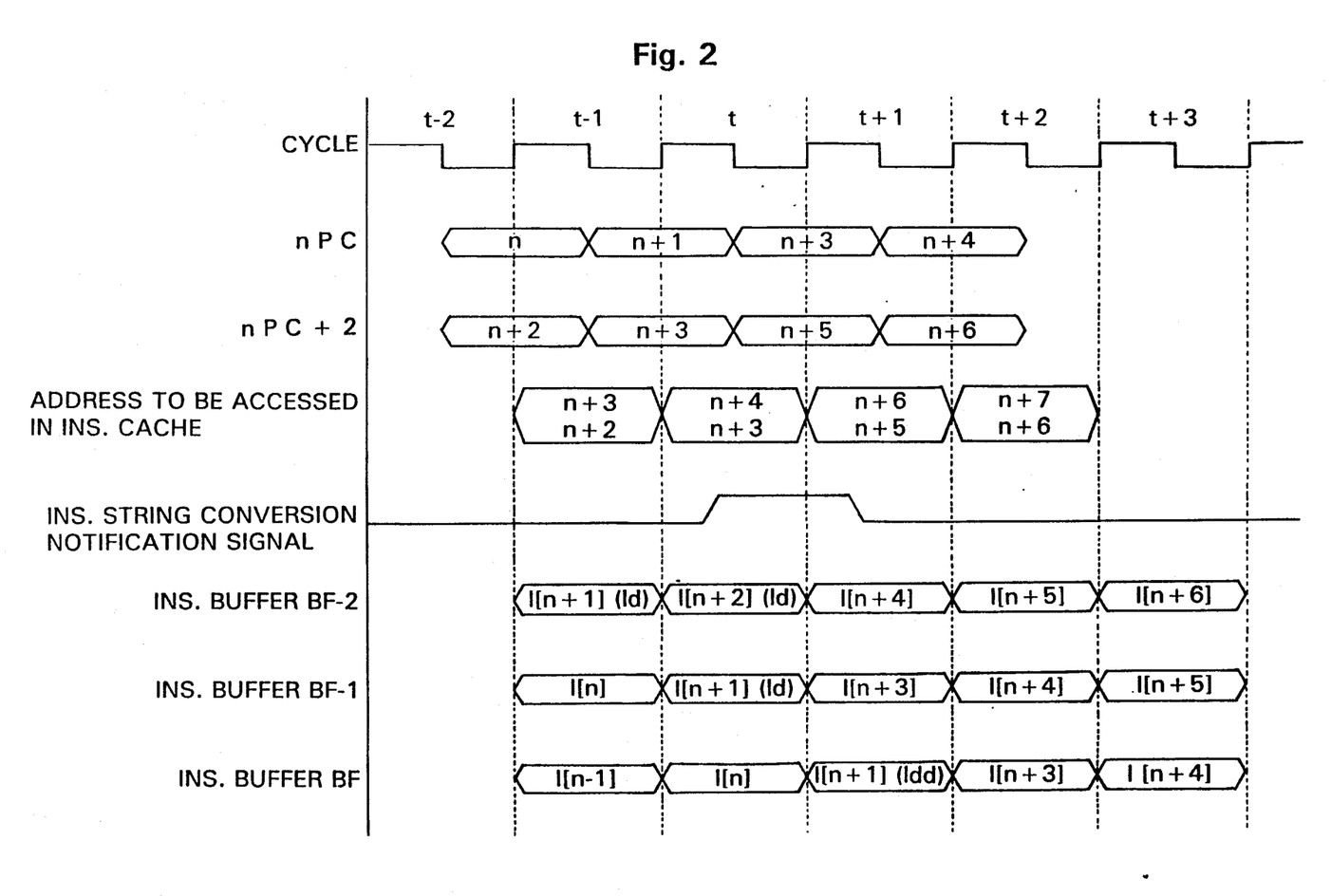
FIG. 2 is a timing chart of instruction buffers used in the embodiment of FIG. 1.

FIG. 2 illustrates the timing of the operation of this embodiment in a case in which there are no miss-hits in the instruction cache 13. In FIG. 2, the instruction address "n+2" indicated by "nPC+2" is output from the program counter 11 during the period from cycle t-2 to cycle t-1. Here, the instruction address shown at "nPC+2" is generated from the instruction address shown at "nPC" in the program counter 11.

During the cycle t-1, a portion of the instruction from the instruction address "n+2" which is a logical address is converted to a physical address, and the instruction cache 13 is accessed. The instructions at the two consecutive instruction addresses "n+2" and "n+3" are read into the instruction buffer unit 1 via the buses 14 and 15.

When changing from the cycle t-1 to the cycle t, the instruction I[n+1] which was supplied to the instruction buffer BF-2 is supplied to the instruction buffer BF-1, and the instruction I[n] which was supplied to the instruction buffer BF-1 is supplied to the instruction buffer BF. The instruction I[n+2] is supplied to the empty instruction buffer BF-2 from the instruction cache 13.

The instruction I[n] which was supplied to the instruction buffer BF in the cycle t is the instruction at the address indicated by nPC during the period from cycle t-2 to cycle t-1. The pipeline processing of the instruction I[n] is performed from the FETCH stage. In this cycle t, the instruction codes of the instructions I[n+1] and I[n+2] at the addresses following nPC are checked by the instruction string check circuit 5. In this case, the instructions I[n+1] and I[n+2] are both single-word load instructions "ld" which can be executed simultaneously as one double-word load instruction "ldd". Therefore, the instruction string conversion notification signal 10 is transferred from the instruction string check circuit 5 to the program counter 11 during the period from cycle t to cycle t+1, and the values of nPC and nPC+2 advance one extra instruction from "n+1" to "n+3" and from "n+3" to "n+5", respectively.

In the next cycle t+1 which is the FETCH stage for the instruction I[n+1], the instruction I[n+1] (ldd) converted in the instruction string check circuit 5 is stored into the instruction buffer BF. Since the two instruction buffers BF-1 and BF-2 become empty simultaneously in this cycle, the two instructions I[n+3] and I[n+4] are accessed from the instruction cache 13, and are supplied to the instruction buffers BF-1 and BF-2, respectively.

Figure 3B:
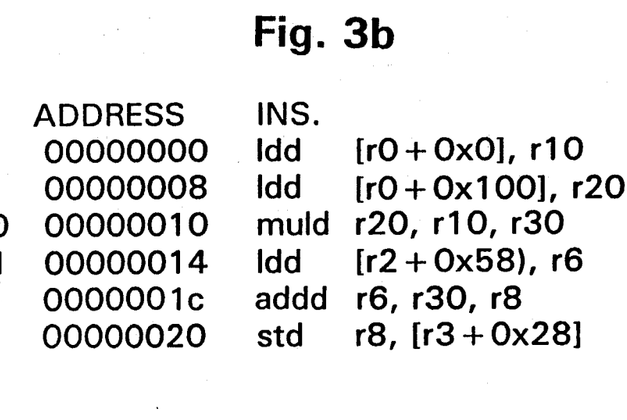
FIG. 3B illustrates the sequence performed in the embodiment of FIG. 1 when the source program is to be executed.

FIG. 3B illustrates the instruction execution sequence performed in this embodiment when the source program of FIG. 3A is to be executed. As seen from FIG. 3B, the four single-word load instructions "ld" and two single-word store instructions "st" are converted to the two double-word load instructions "ldd" and one double-word store instruction "std", so that the source program which was executed by ten steps in the prior art can be executed by six steps. In the case in which all instructions can be executed in one cycle by pipeline processing, according to the embodiment, the required number of steps can be reduced by 40%. Moreover, in mathematical programs or the like which often use sum of products operations such as "muld" and "addd", load and store operations are often present before and after these operations, the degree of reduction in the number of steps according to the invention is particularly great.

In the embodiment described above, the instruction buffer unit comprises three stages of instruction buffers. Alternatively, the instruction buffer unit may have four or more stages of instruction buffers, or two stages of instruction buffers. In the latter case, the instruction buffer BF is not formed, and instructions are directly supplied from the instruction buffer BF-1 to the instruction decoder 16. Each of the instruction buffer stages may have only one instruction buffer which can store a plurality of instructions. In this case, a plurality of instructions are taken from the instruction cache in every cycle, and these instructions are executed in parallel. In the embodiment of FIG. 1, load or store instructions were used. It is needless to say that instructions (such as move instructions) other than load or store instructions can be used in the apparatus according to the invention.

Figure 7A:
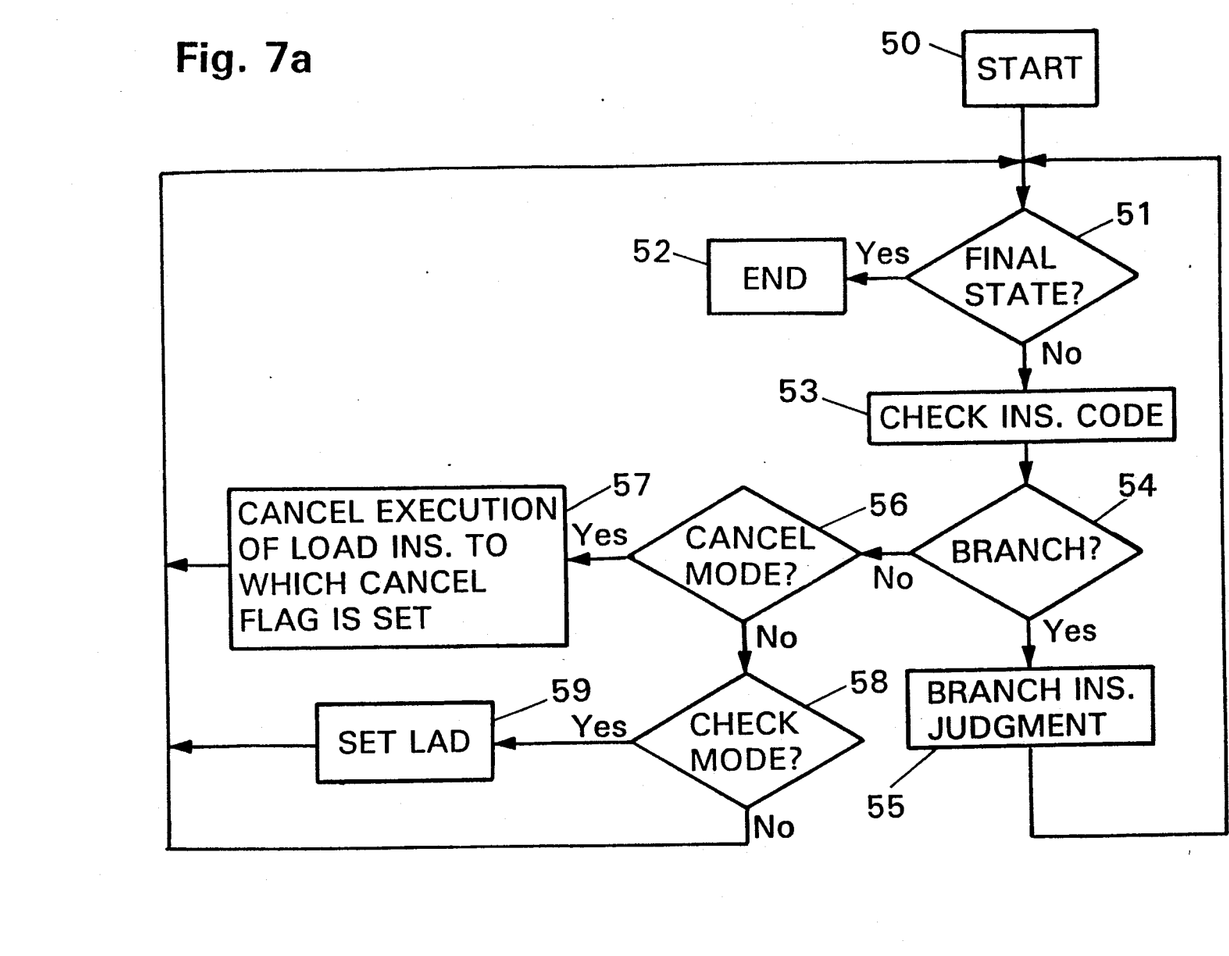
FIGS. 7A and 7B are flowcharts illustrating the algorithm for detecting a program loop in another embodiment of the invention.

FIG. 7A illustrates the loop detection algorithm in another embodiment of the invention. In this embodiment, an instruction buffer unit detects a loop during execution of instructions in the instruction buffer circuit. Then, load instructions which do not need to be executed multiple times in the program loop are detected, and the execution of the load instructions which is not required to be done in the loop is canceled.

In this embodiment, the program of FIG. 7A starts from step 50, and in step 51 it is judged whether or not the current status is the final stage of the execution of the program. If it is the final stage of the execution of the program, then execution of the program is terminated in step 52. If it is not the final stage of the execution of the program, then the instruction code is checked in step 53 in an instruction string check circuit formed in the instruction buffer unit, and in step 54 the instruction string check circuit checks whether or not the instruction code is a branch instruction. If NO, the process proceeds to step 56. If YES, the process proceeds to the branch instruction Judgment in step 55.

Figure 7B:
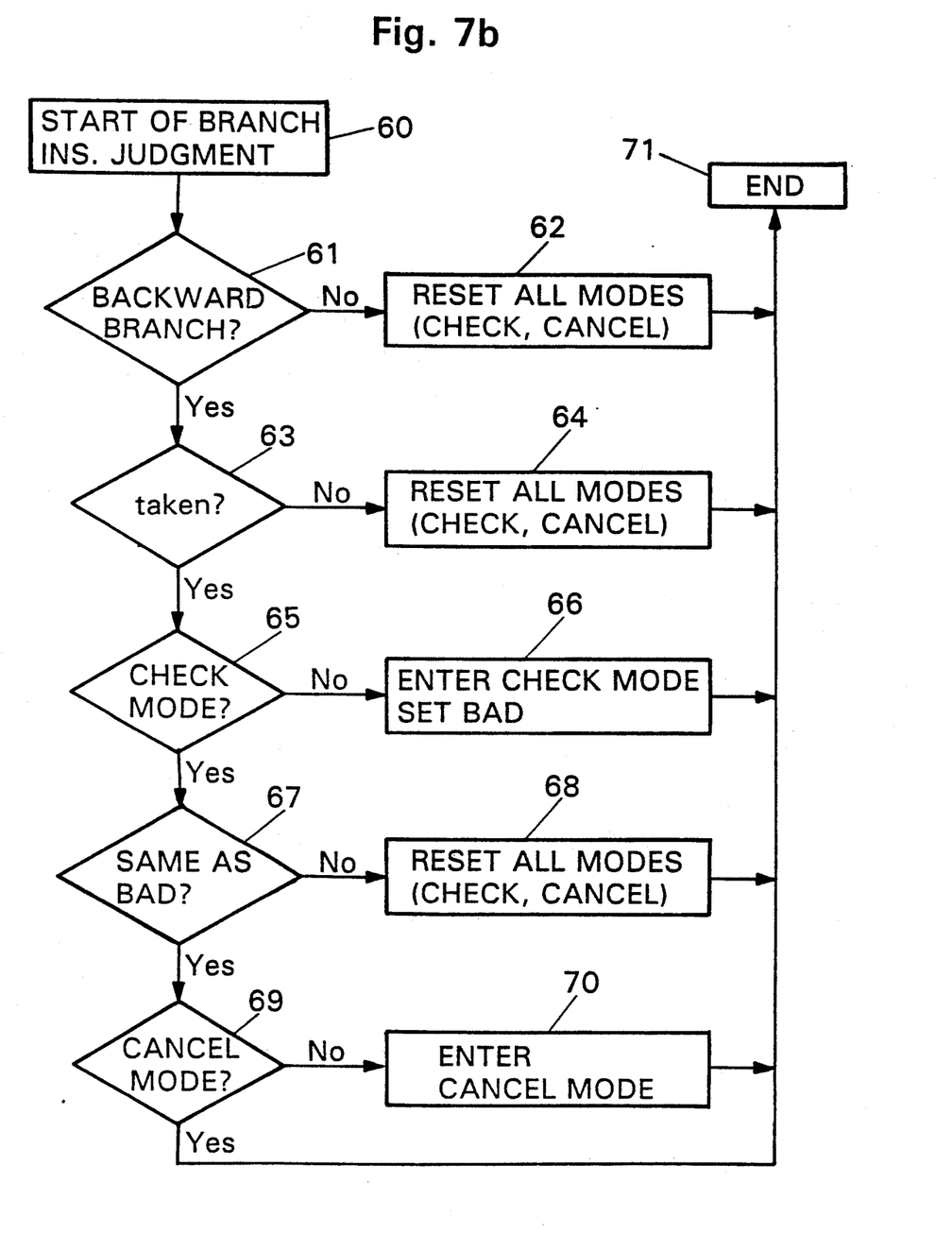

FIG. 7B illustrates the details of the algorithm used in the branch instruction judgment step 55. The branch instruction judgment begins from step 60, and in step 61 the instruction code is checked to determine whether or not it is a backward branch instruction. If the instruction code is not a backward branch instruction, then the process proceeds to step 62 in which all modes (the check mode and cancel mode) in the instruction string check circuit are canceled, and the branch instruction judgment is terminated (step 71). If the instruction code is a backward branch instruction, then the process proceeds to step 63 where it is judged whether or not the backward branch instruction has been taken (i.e., whether or not the backward branch has been achieved). If the backward branch instruction has not been taken, then process proceeds to step 64 to cancel all modes (the check mode and cancel mode) in the instruction string check circuit, and the branch instruction judgment is terminated (step 71). If it is judged in step 63 that the backward branch instruction has been taken, then the combination of the address of the backward branch instruction and the address of the target instruction is stored in the instruction string check circuit. Then, it is checked in step 65 whether or not the current 15 mode is the instruction string check mode.

Figure 9A:
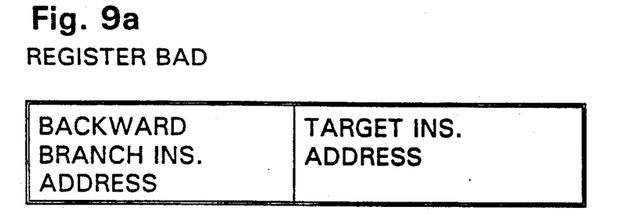
FIG. 9A illustrates a register for storing a backward branch instruction address and a target instruction address.
Figure 9B:
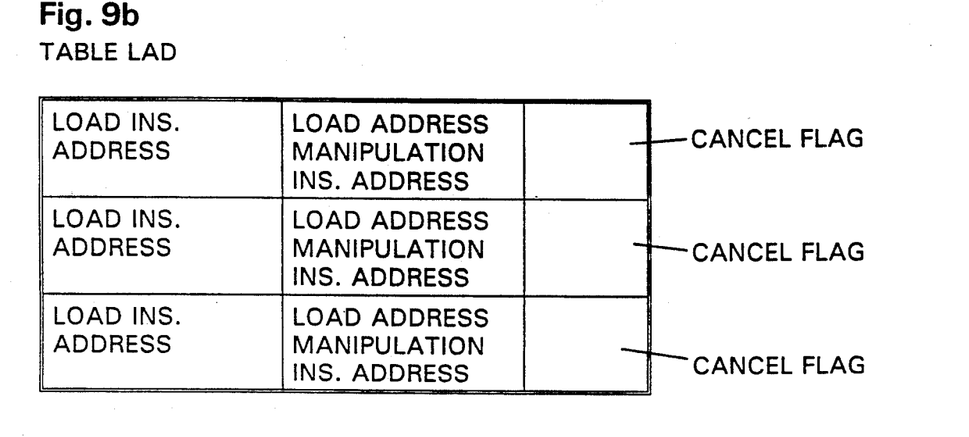
FIG. 9B illustrates a register for storing load instruction addresses and load address manipulation instruction addresses.

In the instruction string check mode, instruction codes in the program loop are checked to detect a combination of a load instruction and an operation instruction which manipulates the address of the load instruction, and detected combinations of the instructions are stored in a table LAD in the instruction string check circuit. The format of the table LAD is shown in FIG. 9B. The table LAD comprises load instruction addresses, addresses of instructions for manipulating the load instruction addresses, and cancel flags. Since load instructions to which the cancel flag is set are required only to be executed once in the program loop, the execution of the load instructions flagged for cancellation is canceled in the instruction buffer circuit in the execution of instructions in the third and subsequent implementation of the loop.

When the current mode is not the instruction string check mode in step 65, the process proceeds to step 66 where it enters the instruction string check mode. In the instruction string check mode, the combination of the back-branch instruction address stored in the instruction string check circuit end the target instruction address is stored in a register BAD in the instruction string check circuit. Then, the branch instruction judgment is terminated in step 71. FIG. 9A shows the format of the register BAD. The register BAD comprises combinations of a backward branch instruction address and a target instruction address, and is used to detect program loops. When the current mode is the instruction string check mode in step 65, the process proceeds to step 67, and the combination of the backward branch instruction address and the target instruction address which has been stored in step 63 in the instruction string check circuit is checked whether or not it is the same as the contents of the register BAD set in step 66. If NO, all modes (the check mode and cancel mode) in the instruction string check circuit are canceled in step 68, end the branch instruction judgment is terminated in step 71.

When it is judged in step 67 that the contents are the same, it is checked in step 69 whether or not the current mode is the cancel mode. In the cancel mode, the execution of load instructions to which the cancel flag is set in the table LAD is canceled in the implementation of the program loop. If the current mode is not the cancel mode in step 69, then the process proceeds to step 70 where the cancel mode is set, and the branch instruction judgment is terminated in step 71. When the current mode is the cancel mode in step 69, the branch instruction judgment is terminated in step 71.

When the current mode is the cancel mode in step 56 shown in FIG. 7A, the process proceeds to step 57 in which the address of the instruction checked in step 53 in the instruction string check circuit is compared with the load instruction address in the table LAD. If the instruction checked in step 53 is the load instruction to which the cancel flag is set in the table LAD, execution of the load instruction is canceled by the instruction buffer unit, and the process returns to step 51. If the current mode is not the cancel mode in step 56, then the process proceeds to step 58 to determine whether or not the current mode is the instruction string check mode. If YES in step 58, the process proceeds to step 59. In step 59, when the instruction checked in step 53 is a load instruction or an instruction for manipulating the load address, the load instruction address or the address of the instruction for manipulating the load address is stored at an appropriate location in the table LAD, and the process returns to step 51. When a load instruction for which a corresponding load address manipulation instruction is not detected is stored in the table LAD in step 59, the cancel flag is set to the load instruction. When the corresponding load address manipulation instruction is detected in the subsequent process, the cancel flag is cleared at the time the combination of the load instruction address, and the address of the load address manipulation instruction is stored in the table LAD. When a load address manipulation instruction for which a corresponding load instruction is not detected is detected, the instruction is stored in the table LAD without setting the cancel flag. When the current mode is not the instruction string check mode in step 58, the process returns to step 51.

Figure 8:
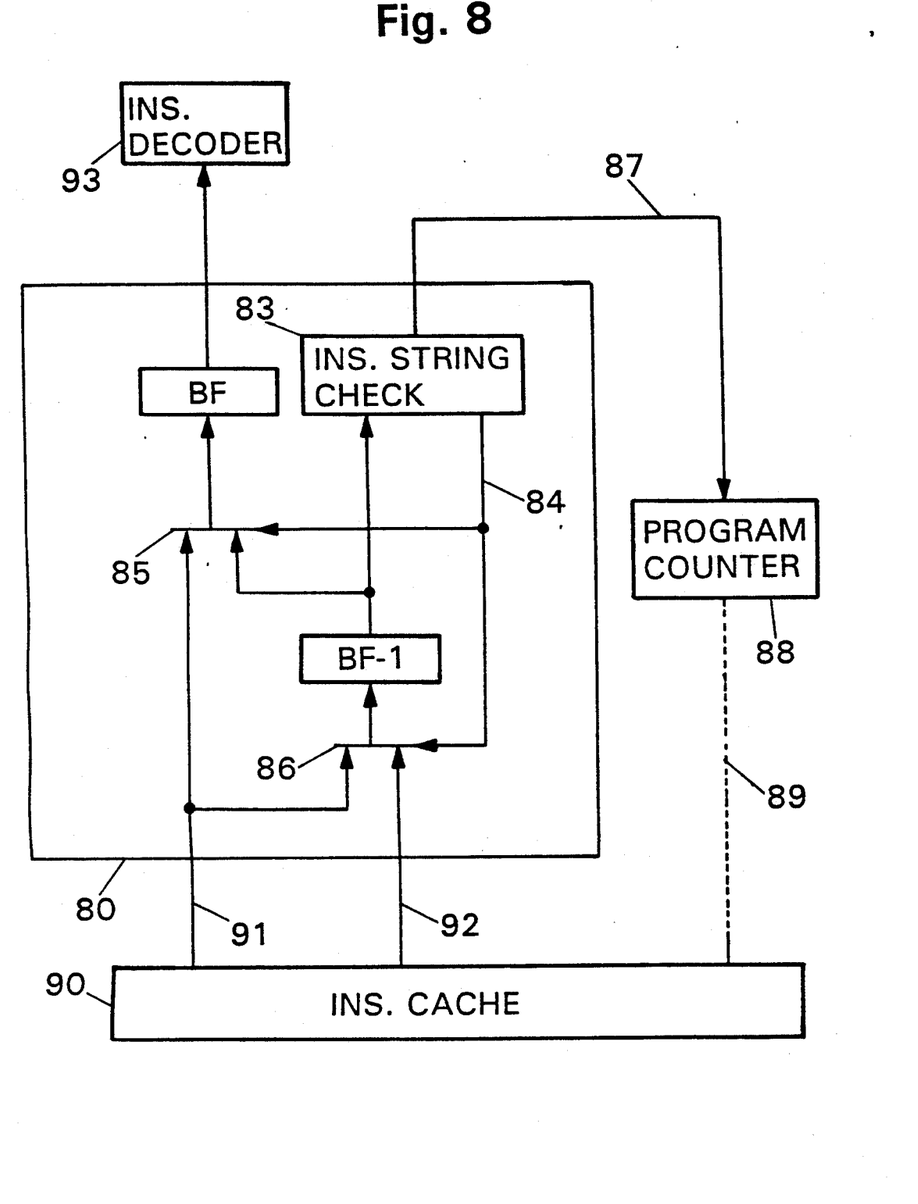
FIG. 8 is a block diagram illustrating the embodiment.

FIG. 8 illustrates an instruction buffer unit employing the loop detection algorithm of FIGS. 7A and 7B. This instruction buffer unit is configured so that, even when load instructions detected using the loop detection algorithm are canceled, instructions are supplied from the instruction cache so that the instruction buffer is not left empty. In FIG. 8, the instruction buffer unit, which is referenced by numeral 80, comprises instruction buffers BF and BF-1, an instruction string check circuit 83 which checks the instruction code in the instruction buffer BF-1, and selectors 85 and 86 which receive a selector control signal 84 from the instruction string check circuit 83. Numeral 87 indicates an instruction cancel signal, 88 a program counter, and 89 an instruction address nPC+1 used to access an instruction cache 90. Two addresses nPC+1 and nPC+2 are accessed in the instruction cache 90, and two instructions at address nPC+1 and address nPC+2 are supplied to the instruction buffer circuit 80 via buses 91 and 92, respectively. In FIG. 8, 93 designates an instruction decoder.

The operation of the instruction buffer unit 80 will be described. While the instruction in the instruction buffer BF is executed, the instruction in the instruction buffer BF-1 which is not currently executed is input into the instruction string check circuit 83 where the instruction code is in turn checked using the algorithm shown in FIGS. 7A and 7B. When the checked instruction is not a load instruction to which the cancel flag is set, the instruction in the instruction buffer BF-1 is supplied to the instruction buffer BF in the next cycle, and the selectors 85 and 86 are controlled by the instruction string check circuit 83 using the selector control signal 84 so that the instruction at the address nPC+1 indicated by the program counter 88 is supplied from the instruction cache 90 to the instruction buffer BF-1 via the bus 91. When the instruction in the instruction buffer BF-1 is a load instruction to which the cancel flag is set, the instruction cancel signal 87 is issued to inform the program counter 88 of cancellation of the execution of the load instruction and also of the address of the next instruction to be executed. The address of the next instruction to be executed can be set by looking at the table LAD (FIG. 9B) in the instruction string check circuit 83.

In the cycle subsequent to that next cycle, the value of the program counter 88 is adjusted using the instruction cancel signal 87, so that new instructions are supplied simultaneously to the two instruction buffers BF and BF-1 which have been made empty by cancellation of the execution of the instruction in the instruction buffer BF-1. At this time, the selector control single 84 is output from the instruction string check circuit 83 so that the selector 85 connects the instruction cache 90 with the instruction buffer BF via the bus 91 and the selector 86 connects the instruction cache 90 with the instruction buffer BF-1 via the bus 92. By this means, instructions are supplied to the instruction buffers BF and BF-1 so that the execution of instructions is not interrupted and is continued even when the execution of the load instruction is canceled.

In the loop detection algorithm shown in FIGS. 7A and 7B, instructions the execution of which can be canceled are detected by the instruction buffer in the second implementation of the program loop. This is because there are cases in which there is branching from outside the program loop to inside the loop, thus making it impossible to detect such instructions in the instruction buffer in the first implementation of the program loop. In the embodiment described above, the instruction buffer unit comprises two stages of instruction buffers, but of course an instruction buffer unit with the same function can be configured with three or more stages of instruction buffers. Each of the instruction buffer stages may have only one instruction buffer which can store a plurality of instructions. In this case, a plurality of instructions are taken from the instruction cache in every cycle, and these instructions are executed in parallel.

According to the invention, a plurality of instructions which can be executed simultaneously are executed after they are converted to one instruction. Therefore, instructions are optimized in instruction buffers so that, even when source programs output from compilers with poor optimization performance are used, instructions which require multiple cycles to execute in the prior art can be processed quickly in one cycle, thus realizing significant practical effectiveness. The invention demonstrates its effectiveness particularly in cases in which it cannot be determined until the execution stage whether or not instructions for two single words can be converted to an instruction for one double word.

Also, according to the invention, instructions the execution of which can be canceled in the second implementation of a program loop are detected in an instruction buffer, and their execution is canceled in the execution of instructions in the third and subsequent implementation of the program loop. Instructions can be continuously supplied to the instruction buffer from the instruction cache so that the instruction buffer is not left empty, whereby the number of execution steps can be greatly reduced in the execution of programs containing many loops, thus realizing a significant practical effectiveness.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An information processing apparatus comprising:
   a plurality of instruction buffers each for storing an instruction;
   detection means for checking said instructions stored in said instruction buffers to detect a program loop and any instructions in said program loop unnecessary to be executed in second and subsequent implementations of said program loop;
   cancel means for canceling the execution of said detected instructions in the third and subsequent implementations of said program loop; and
   adjust means for adjusting the contents of a program counter which indicates the addresses of the instructions which are to be stored in said instruction buffers, said instruction buffers being able to store said instructions to be stored as a result of said cancellation.

2. An information processing apparatus according to claim 1, wherein said detected instruction is a load instruction which has no correspondence with a load address manipulating instruction in said program loop, said load address manipulating instruction manipulating the address to be loaded.

3. An information processing apparatus according to claim 1, wherein said program loop is caused by a backward branch instruction.

4. An information processing apparatus according to claim 3, wherein said detection means detect said program loop on the condition that the address of said backward branch instruction and the address of the target instruction of said backward branch instruction are successively detected.

* * * * *